No. 711,505. Patented Oct. 21, 1902.
J. R. JOHNSON.
BRAKE FOR WAGONS.
(Application filed July 7, 1902.)
(No Model.) 7 Sheets—Sheet 1.

WITNESSES.
Joseph Bates.
E. Howard.

INVENTOR
James R. Johnson
by O'Brien
atty.

No. 711,505. Patented Oct. 21, 1902.
J. R. JOHNSON.
BRAKE FOR WAGONS.
(Application filed July 7, 1902.)

(No Model.) 7 Sheets—Sheet 5.

WITNESSES.
Joseph Bates.
E. Howard.

INVENTOR
James R. Johnson
by D. William O'Brien
atty

No. 711,505. Patented Oct. 21, 1902.
J. R. JOHNSON.
BRAKE FOR WAGONS.
(Application filed July 7, 1902.)
(No Model.) 7 Sheets—Sheet 6.

WITNESSES.
Joseph Bates.
E. Howard.

INVENTOR
James R. Johnson

No. 711,505. Patented Oct. 21, 1902.
J. R. JOHNSON.
BRAKE FOR WAGONS.
(Application filed July 7, 1902.)
(No Model.) 7 Sheets—Sheet 7.

WITNESSES.
Joseph Bates.
E. Howard.

INVENTOR
James R. Johnson
by J. Ouland O'Brien
atty.

UNITED STATES PATENT OFFICE.

JAMES ROBINSON JOHNSON, OF DARLINGTON, ENGLAND.

BRAKE FOR WAGONS.

SPECIFICATION forming part of Letters Patent No. 711,505, dated October 21, 1902.

Application filed July 7, 1902. Serial No. 114,617. (No model.)

*To all whom it may concern:*

Be it known that I, JAMES ROBINSON JOHNSON, a British subject, and a resident of Darlington, in the county of Durham, England, have invented certain new and useful Improvements in Brakes for Wagons, of which the following is a specification.

This invention relates to improvements in brakes for railway-wagons in which the brake can be applied and released from either side of the wagon, and is designed to provide better means for releasing the brakes and for connecting the releasing-handles and operating them from either side of the wagon and also to provide means for indicating whether the brakes are applied or not. It will be fully described with reference to the accompanying drawings, in which the framework of the wagon is mostly omitted to more clearly illustrate the operative parts of the invention.

Figure 1:
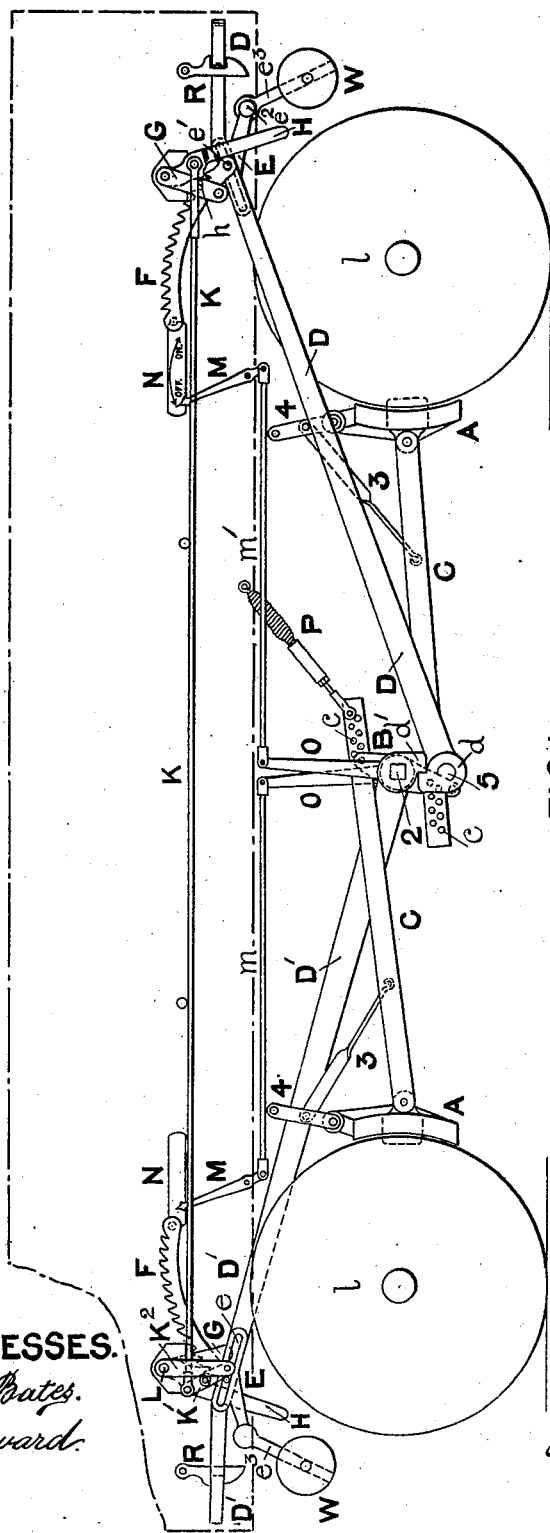
Figure 2:
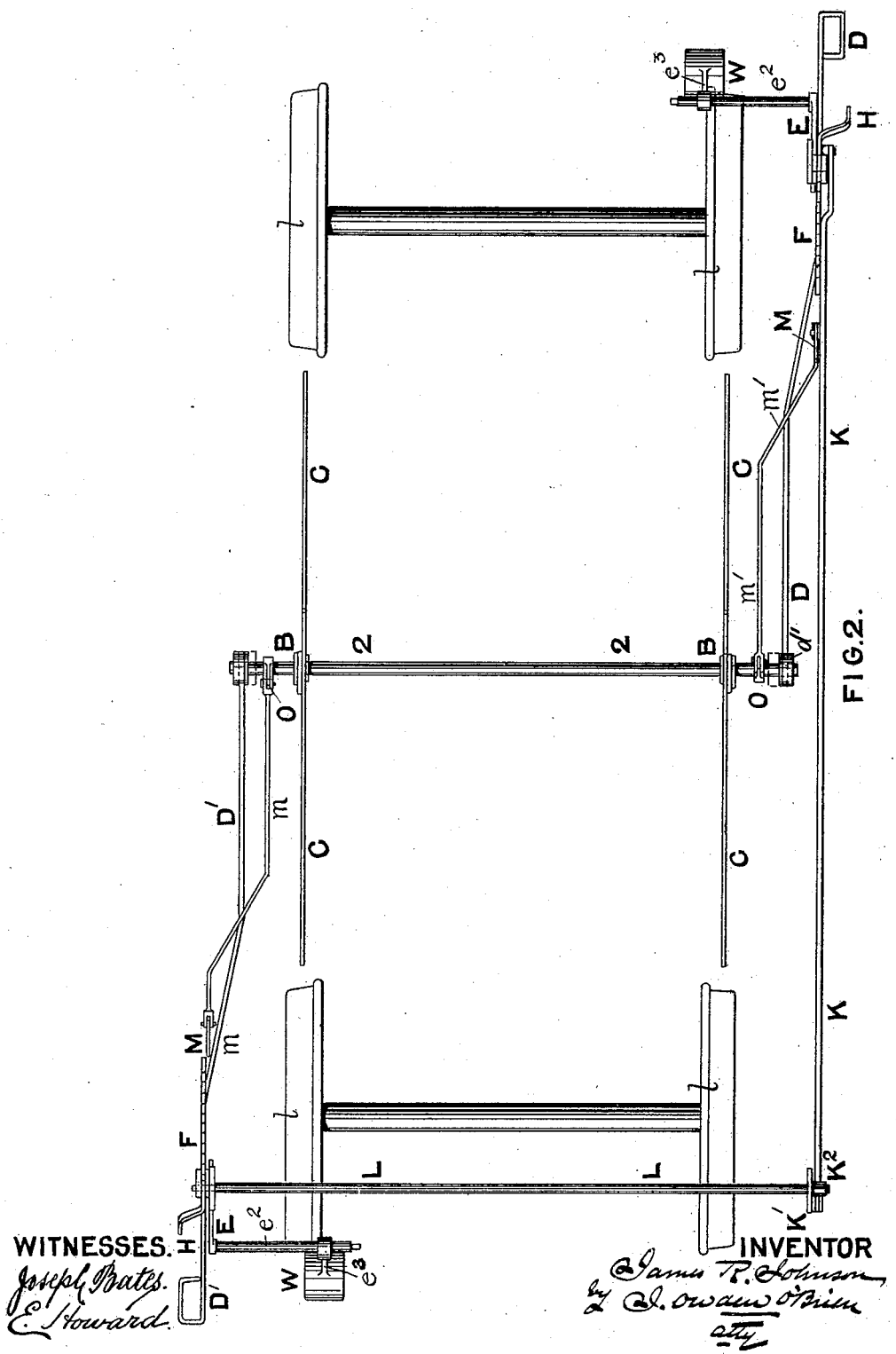
Figure 3:
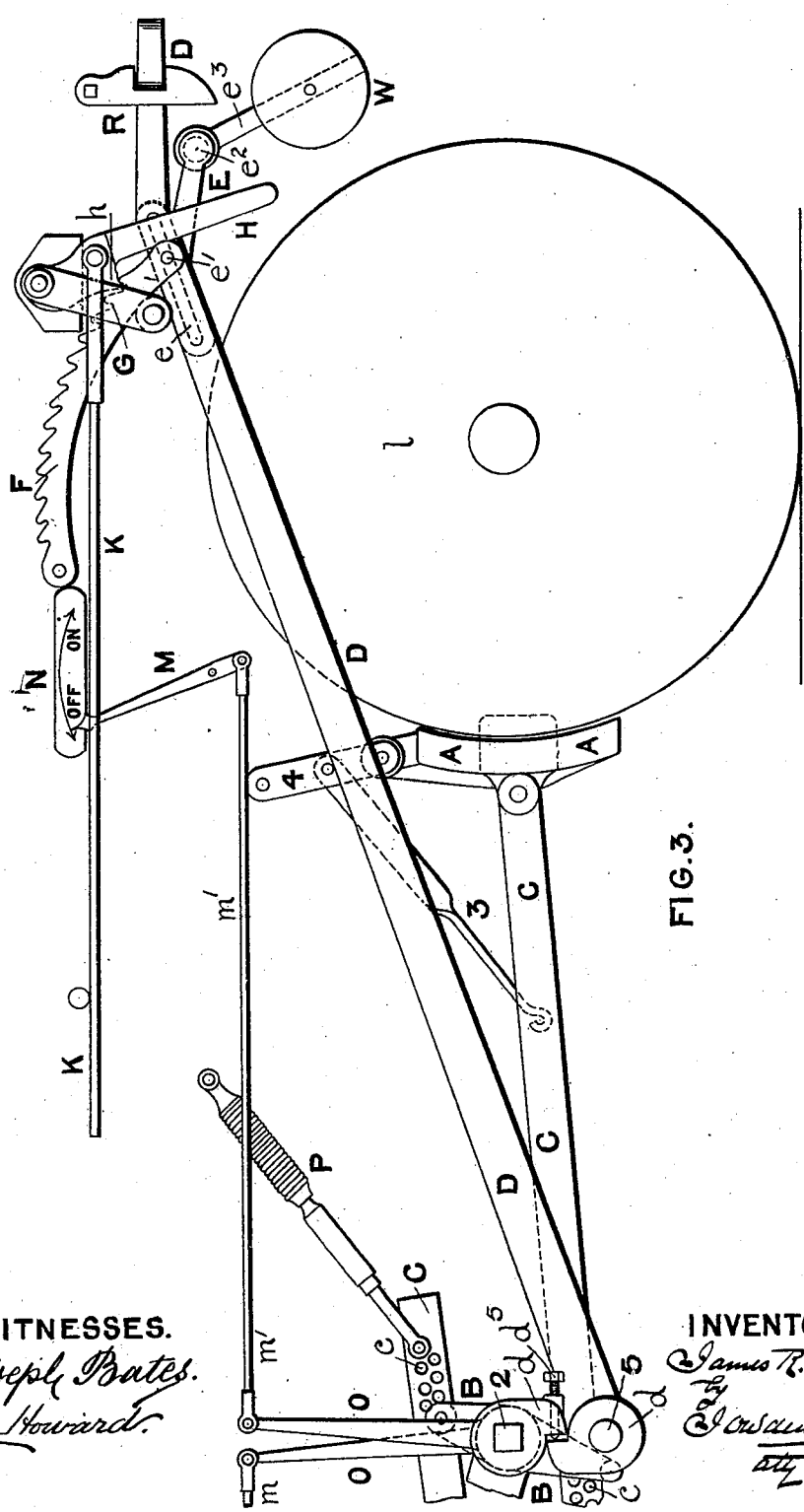
Figure 4:
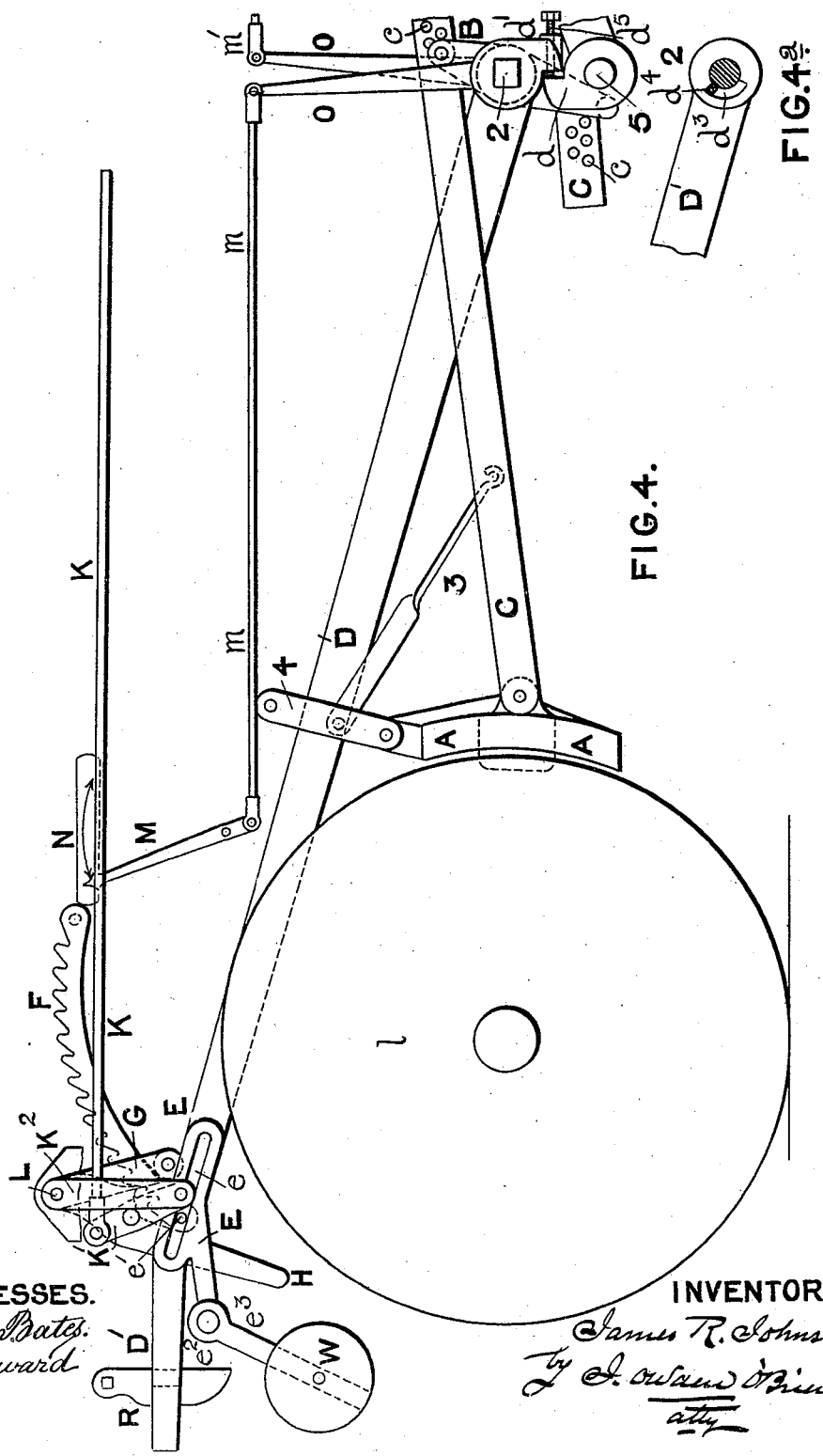
Figure 5:
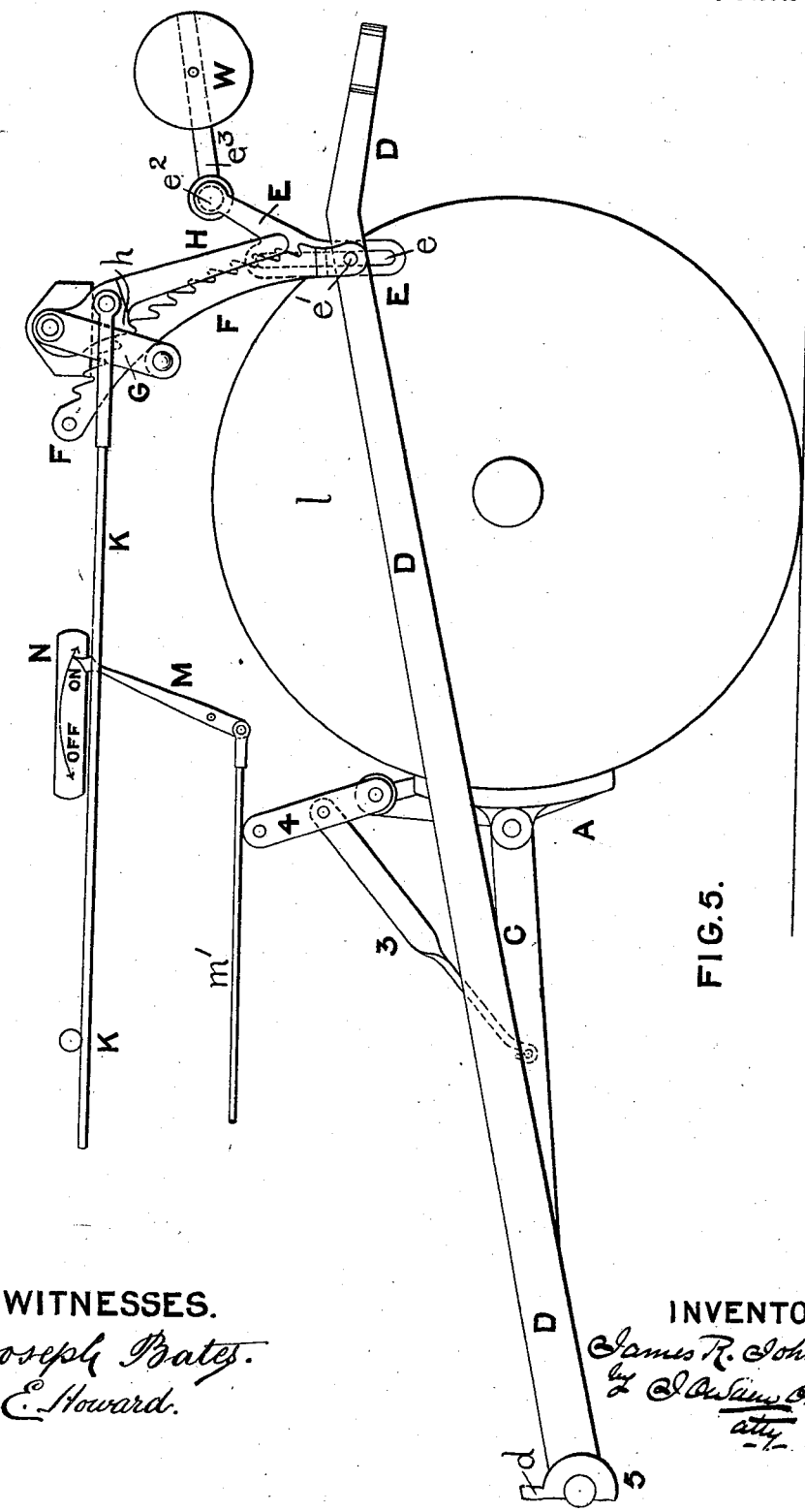
Figure 6:
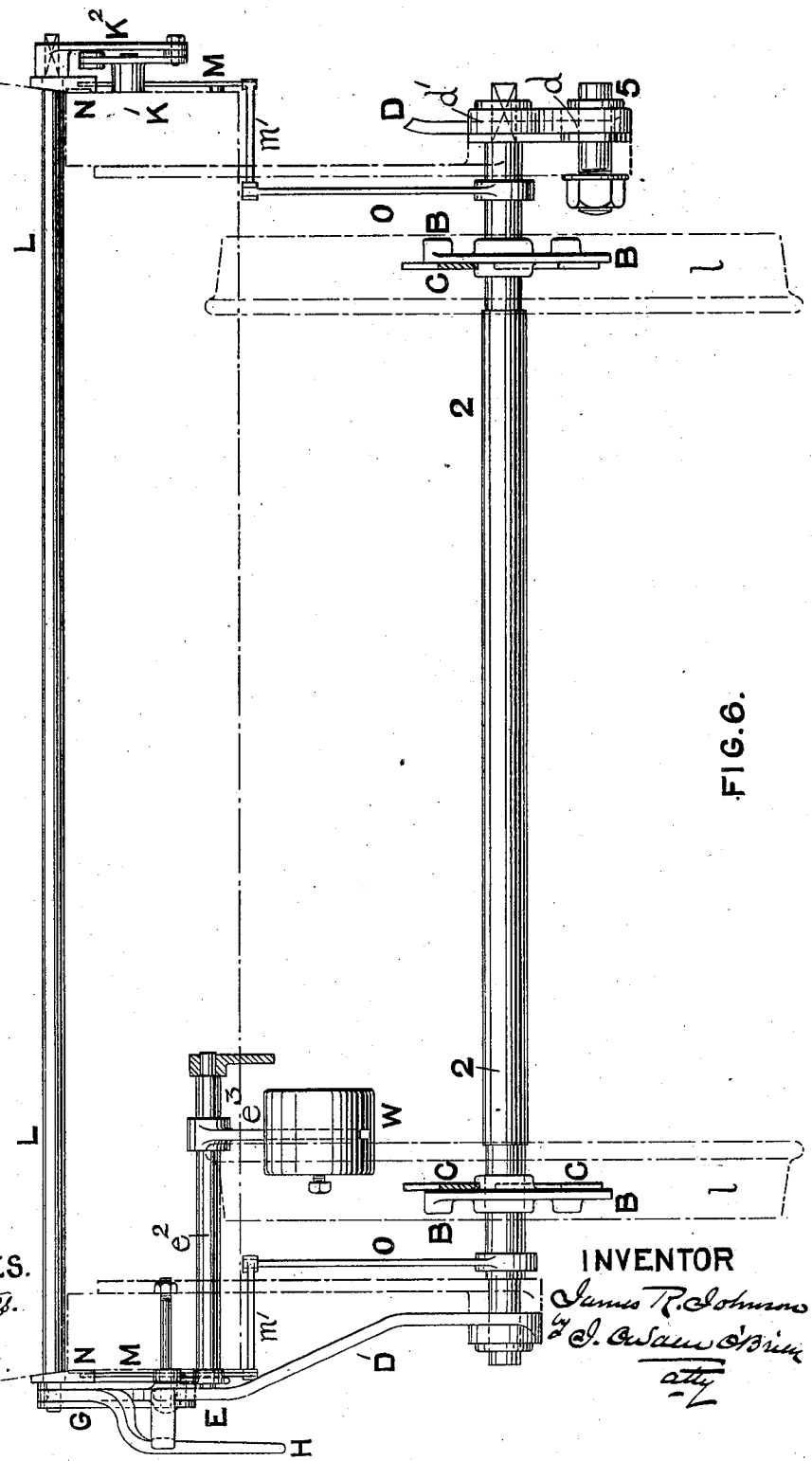
Figure 7:
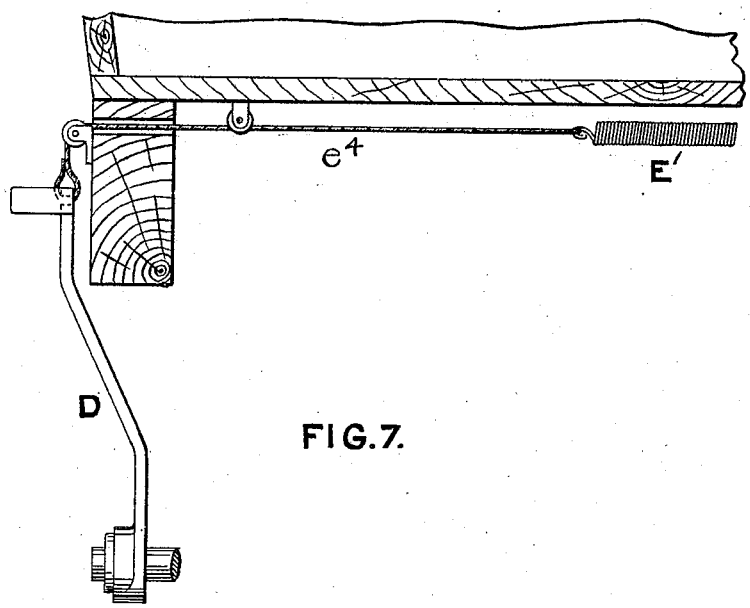
Figure 9:
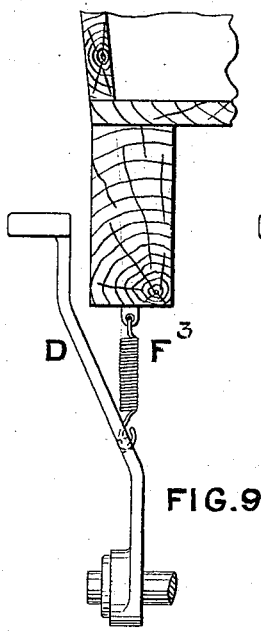
Figure 8:
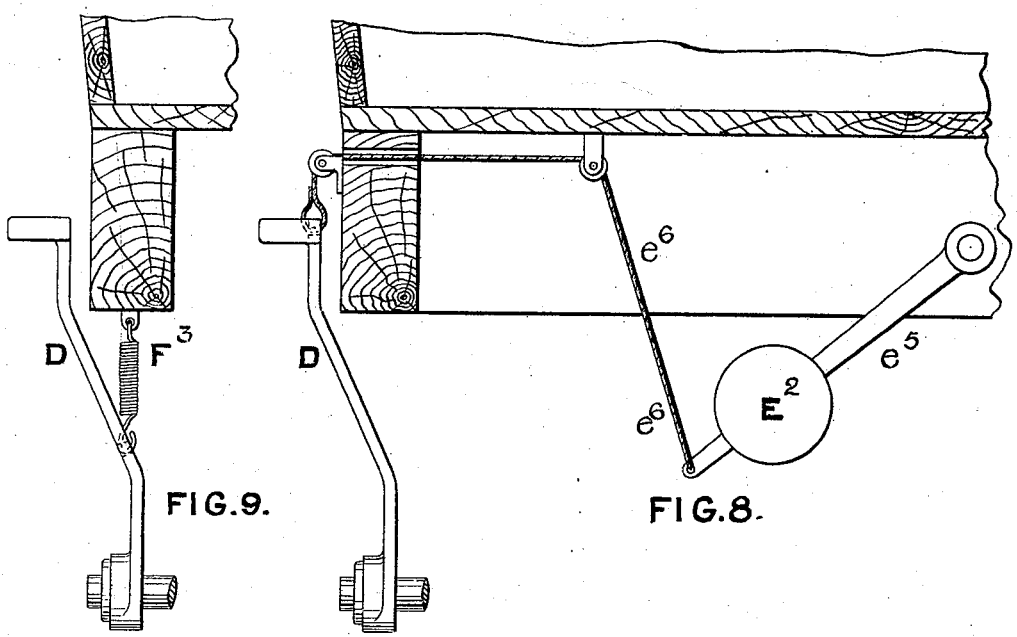

Figure 1 is a side elevation of the brake mechanism viewed from one side of the wagon; Fig. 2, a plan of Fig. 1; Fig. 3, a side elevation of the brake mechanism, (at right-hand end of wagon, Figs. 1 and 2,) showing position when the brake is off, drawn to an enlarged scale; Fig. 4, a side elevation of the brake mechanism, (at left-hand end of wagon as seen in Figs. 1 and 2,) drawn to enlarged scale; Fig. 4$^a$, a detail of hand-lever D'; Fig. 5, a side elevation of brake mechanism similar to Fig. 3, showing the position of the parts when the brake is applied; Fig. 6, an end elevation of the brake mechanism, (at left-hand end of wagon as seen in Figs. 1 and 2;) Fig. 7, an end elevation showing modified arrangement for raising the brake-lever; Fig. 8, an end elevation showing another modification of same; Fig. 9, an end elevation showing a further modification.

The brakes A are applied to the wheels 1 of the wagon in the hitherto known manner by the levers B on the transverse brake-axle 2, to which are pivoted the brake-levers C, supported by a stay 3 and pivoted link 4.

Pressure is applied to the brakes A, the brake-axle 2, and brake-levers B C on one side of the wagon by the hand-lever D, acting through the clutch-cams $d\,d'$. The clutch-cam $d$ is on a stud 5, to which the hand-lever D is secured, and the clutch-cam $d'$ is secured to the brake-axle 2, so that as the hand-lever D is depressed the brake-axle 2 is rotated. Pressure is applied to the brakes A at the other side of the wagon by the hand-lever D' direct to the brake-axle 2, to which it is keyed, (or secured.) The hand-lever D' is keyed or secured in such a manner as to permit of a partial rotation of the brake-axle in order that the brakes A may be applied by the handle D at the other side of the wagon, while the handle D' remains stationary. This is effected by forming a wide slot $d^3$ in the end of the handle D', within which the key $d^4$ can move laterally for a limited distance while the brake-axle rotates. (See Fig. 4$^a$.) This also permits of the brakes being operated by pneumatic or other power in addition to being operated by hand.

One or both of the clutch-cams $d\,d'$ are fitted with an adjusting-screw $d^5$, by which they can be set relatively to one another and wear taken up, so that the clutch $d$ and brake-axle 2 shall be operated and the brakes A applied immediately on the movement of the hand-lever D.

The hand-levers D D' are similarly arranged and supported at the two sides of the wagon, being counterbalanced by a weighted lever E or by a spring E' or weight E$^2$, and when depressed are held down by the toothed quadrant F, pivoted at one end to the lever and traveling through a link G, the teeth on the quadrant engaging the tooth $h$ on the lever H. When the lever H is raised and the quadrant-rack F released, the hand-lever D or D' is raised at once by weighted lever E and the brake removed.

The lever E is provided with a long slot $e$ at one end, which engages the pin $e'$, attached to the lever D or D'. It is affixed to a spindle $e^2$ with a second lever $e^3$, upon which is placed the weight W.

In the modifications shown in Fig. 7 the hand-lever D is raised by the spring E', attached to a band $e^4$, and in the modification shown in Fig. 8 the hand-lever D is raised by the weight E$^2$ on the pivoted arm $e^5$, attached to the band $e^6$.

In Fig. 9 another modification is shown in which the hand-lever D is raised by the spring E$^3$, attached directly to it. The springs E' and E$^3$ may be arranged to act either under compression or tension.

As stated, the brakes A may be applied at either side of the wagon by either hand-lever D or D'. It is also necessary that the brakes can be released from either side of the wagon—that is, the hand-lever D may be released by a man standing beside D'. For this purpose the two levers H are connected, so that the raising of one of them simultaneously raises the other and releases whichever of the quadrant-racks F is engaged, thereby permitting the respective hand-lever D or D' to be raised by the weight or spring.

To the lever H at one side of the wagon is pivoted a rod K, which extends the length of the wagon. The other end of the rod K is attached to one end of a lever K' on the same side of the wagon. The lever K' is pivoted to the wagon side, (see end elevation, Fig. 6,) and to the other end is pivoted a second lever K², keyed to the end of a shaft or spindle L, which extends across the wagon from one side to the other, upon which the lever H at the other side of the wagon is also fixed. The raising of the lever H at one side of the wagon moves the rod K, the levers K' and K², and the spindle L, or vice versa, thereby raising the lever H simultaneously at the other side of the wagon. By this arrangement and construction the brakes A may be released or thrown off by raising either of the levers H.

To indicate at both sides of the wagon whether the brakes A are "on" or "off," irrespective of the position of the hand-levers D and D', two indicators or pointers M are provided, one at each side of the wagon, with an index-plate N, marked "On" and "Off." On the brake-axle 2 two levers O are secured, one at either end, and each of these is connected by the rods or links m m' with the respective indicators or pointers M. When the brakes A are off, the pointers M are in the position shown in Figs. 1, 3, and 4, and when they are on or applied to the wheels the pointers M are in the position shown in Fig. 5.

The brake levers or arms C are connected to the brake-levers B by means of an adjustable pin or bolt passed into the eyelets or holes c, so that the position of the arms can be readily adjusted, and a spring P is attached to the arm C to insure that the brake-blocks A may be held clear of the wheels when the brake is off.

In proximity to each hand-lever D and D' a catch R is pivoted to the wagon side to engage the lever when in the off or raised position (see Figs. 1, 3, and 4) and so secure the hand-levers from any downward pressure when it is not desired that the brakes should be applied such as the lever being ridden upon by the brakesman or from the motion of the wagon when it is running.

What I claim as my invention, and desire to protect by Letters Patent, is—

1. In a brake for wagons the combination with the brakes A engaging the wheels, the brake-arms C, brake-levers B to which the arms are pivoted, the connecting brake-spindle 2 placed transversely to carry the levers B and operate the brakes at both sides of the wagon, the hand-levers D D' to operate the brakes and the clutch-cams d d' which connect the hand-lever D' with the brake-axle, of the rack-quadrants F pivoted to the hand-levers D and D' to hold the hand-levers down, means to raise the hand-levers when released, the retaining and releasing levers H pivoted to the wagon sides, means to connect the two levers to cause them to move simultaneously, and means connected with the brake-axle 2 to indicate whether the brakes are "off" or "on," substantially as described.

2. In a brake for wagons, the combination with the brakes A engaging the wheels, the brake-arms C, brake-levers B to which the arms are pivoted, the connecting brake-spindle 2 placed transversely to carry the levers B and operate the brakes at both sides of the wagon, the hand-levers D D' to operate the brakes and the clutch-cams d d' which connect the hand-lever D' with the brake-axle, of the rack-quadrants F pivoted to the hand-levers D and D' to hold the hand-levers down, the pivoted weighted levers E to raise the hand-levers D D' when released, the retaining and releasing levers H to engage the rack-quadrants F, the rods and levers K K' K² and spindle L to connect the levers H and cause them to move simultaneously, the pointers M and index-plate N to indicate whether the brakes are "on" or "off," the levers O and rods m m' to connect the pointers M with the brake-axle, and the pivoted catches R to hold the hand-levers D and D' when raised substantially as described.

In witness whereof I have hereunto signed my name in the presence of two subscribing witnesses.

JAMES ROBINSON JOHNSON.

Witnesses:
JOHN THOMAS JORDAN,
DAVID JORDAN.